(12) United States Patent
Tsutsumi et al.

(10) Patent No.: US 10,136,586 B2
(45) Date of Patent: Nov. 27, 2018

(54) SEEDBED HOLDING UNIT

(71) Applicant: TSUBAKIMOTO CHAIN CO., Osaka-shi, Osaka (JP)

(72) Inventors: Kazuhiro Tsutsumi, Osaka (JP); Go Ito, Osaka (JP)

(73) Assignee: TSUBAKIMOTO CHAIN CO., Osaka-shi (JP)

(*) Notice: Subject to any disclaimer, the term of this patent is extended or adjusted under 35 U.S.C. 154(b) by 1 day.

(21) Appl. No.: 15/388,057

(22) Filed: Dec. 22, 2016

(65) Prior Publication Data
US 2017/0099784 A1 Apr. 13, 2017

Related U.S. Application Data

(63) Continuation of application No. PCT/JP2015/058029, filed on Mar. 18, 2015.

(30) Foreign Application Priority Data

Jun. 26, 2014 (JP) ................. 2014-131625

(51) Int. Cl.
*A01G 9/10* (2006.01)
*A01G 9/029* (2018.01)
(Continued)

(52) U.S. Cl.
CPC .......... *A01G 9/0299* (2018.02); *A01C 11/025* (2013.01); *A01G 9/0293* (2018.02);
(Continued)

(58) Field of Classification Search
CPC .......... A01G 9/108; A01G 9/086; A01G 9/08; A01G 9/1006; A01C 11/006; A01C 11/02; A01C 11/025
See application file for complete search history.

(56) References Cited

U.S. PATENT DOCUMENTS 3,655,064 A 4/1972 Mayer
4,341,333 A * 7/1982 Boa .................... A01G 9/108
111/104
(Continued)

FOREIGN PATENT DOCUMENTS

JP 9-182509 A 7/1997
JP 11-299362 A 11/1999
(Continued)

OTHER PUBLICATIONS

International Search Report dated Jun. 23, 2015, issued in counterpart application No. PCT/JP2015/058029, w/ English translation. (2 pages).
(Continued)

*Primary Examiner* — Monica L Williams
(74) *Attorney, Agent, or Firm* — Westerman, Hattori, Daniels & Adrian, LLP

(57) ABSTRACT

There is provided a seedbed holding unit capable of reliably and firmly holding a seedbed with a simple structure, causing no damage to a plant. A seedbed holding unit 160 that holds a seedbed B used in plant cultivation includes a first holding member 170 and a second holding member 180 that are rotatable relative to each other about a predetermined rotation axis A, the first holding member 170 is provided with a first claw part 173 in a fixed state, the second holding member 180 is provided with a second claw part 183 in a fixed state, and the seedbed B is held between the first claw part 173 and the second claw part 183 by rotating the first holding member 170 and the second holding member 180 relative to each other.

5 Claims, 9 Drawing Sheets

(51) Int. Cl.
  *B25J 15/08* (2006.01)
  *A01G 22/00* (2018.01)
  *A01C 11/02* (2006.01)
  *A01G 9/04* (2006.01)
  *B25J 15/10* (2006.01)
  *A01G 9/08* (2006.01)

(52) U.S. Cl.
  CPC .......... *A01G 9/0295* (2018.02); *A01G 9/045* (2013.01); *A01G 9/088* (2013.01); *A01G 22/00* (2018.02); *B25J 15/08* (2013.01); *B25J 15/10* (2013.01)

(56) References Cited

U.S. PATENT DOCUMENTS

| | | | | |
|---|---|---|---|---|
| 5,247,761 A | * | 9/1993 | Miles | A01G 9/086 111/104 |
| 6,338,512 B1 | * | 1/2002 | Ruppert | A01B 1/02 294/50.8 |
| 2004/0118328 A1 | * | 6/2004 | Sawatzky | A01C 5/02 111/106 |

FOREIGN PATENT DOCUMENTS

| | | |
|---|---|---|
| JP | 2000-4699 A | 1/2000 |
| JP | 2000-60316 A | 2/2000 |

OTHER PUBLICATIONS

Extended (supplementary) European Search Report dated Jan. 23, 2018, issued in counterpart European Application No. 15811647.5. (7 pages).

\* cited by examiner

Related Art

SEEDBED HOLDING UNIT

TECHNICAL FIELD

The present invention relates to a seedbed holding unit that holds a seedbed used in plant cultivation, and more particularly to a seedbed holding unit that is used in plant transplantation.

BACKGROUND ART

In the prior art, there is known an automatic planting device for a hydroponic seedling, which includes a seedbed transfer conveyor that transfers a seedbed by performing intermittent rotation and lateral reciprocation, a planting panel transfer conveyor that is provided below the seedbed transfer conveyor and transfers a planting panel by performing the intermittent rotation, several transfer opening/closing holders that are positioned above the front end part of the seedbed transfer conveyor, hold and separate several seedbed pieces positioned collectively in the front end row of the seedbed on the seedbed transfer conveyor, and transfer the seedbed pieces forward, several insertion opening/closing holders that are positioned in front of the several transfer opening/closing holders, hold and lower the seedbed pieces transferred by the transfer opening/closing holders, and plant the seedbed pieces by inserting same into holes of the planting panel on the planting panel transfer conveyor, and an operation mechanism that is coupled to the seedbed transfer conveyor and causes the seedbed transfer conveyor to intermittently reciprocate in a lateral direction by the width of the seedbed piece of the seedbed (see, e.g., Patent Literature 1).

In the automatic planting device described in Patent Literature 1, the opening/closing holder (the transfer opening/closing holder and the insertion opening/closing holder) configured to hold the seedbed using a pair of holding pieces capable of linearly moving closer to and away from each other is used as a seedbed holding unit that holds the seedbed.

CITATION LIST

Patent Literature

Patent Literature 1: Japanese Patent Application Laid-open No. 2000-4699

SUMMARY OF INVENTION

Technical Problem

The opening/closing holder described in Patent Literature 1 requires a movement space S for the pair of holding pieces 570 and 580 to move closer to and away from each other in a lateral direction. Accordingly, as shown in Reference Example in FIG. 9, in the case where the pair of the holding pieces 570 and 580 are caused to pass through a hole 521 of a predetermined size and hold a seedbed B positioned beyond the hole 521, it is necessary for the holding pieces 570 and 580 to have a sufficient length. In addition, in the case where limitations are posed on the entire width of the holding pieces 570 and 580 including the movement space S, it is necessary to design each holding piece such that the width thereof is reduced with consideration to the movement space S, so it becomes difficult to secure the rigidity of the holding pieces 570 and 580. As a result, the holding pieces 570 and 580 are more susceptible to deformation and thus incapable of holding the seedbed B firmly, resulting in the problem of slippage of the seedbed B and a failure to hold same.

In addition, as in the opening/closing holder described in Patent Literature 1, in the case where the seedbed B is held by the pair of the holding pieces 570 and 580 capable of moving closer to and away from each other, it is not possible to separately hold each of a plurality of portions (C1, C2, C3, and C4 shown in FIG. 9) of the seedbed B that are spaced part in a direction X in which the holding pieces 570 and 580 move closer to and away from each other, and hence certain limitations are posed on the design of the portion of the seedbed B to be held, e.g. it is not possible to hold the four corners C1 to C4 on the lower surface of the seedbed B separately, as shown in FIG. 9.

The present invention has been devised to solve these problems, and an object thereof is to provide a seedbed holding unit capable of reliably and firmly holding the seedbed with a simple structure, causing no damage to a plant.

Solution to Problem

The present invention is a seedbed holding unit that holds a seedbed used in plant cultivation, the seedbed holding unit including a first holding member and a second holding member that are rotatable relative to each other about a predetermined rotation axis, wherein the first holding member is provided with a first claw part in a fixed state, the second holding member is provided with a second claw part in the fixed state, and the seedbed is held between the first claw part and the second claw part by rotating the first holding member and the second holding member relative to each other, whereby the above problem is solved.

Advantageous Effects of Invention

According to a first aspect of the present invention, by configuring the seedbed holding unit such that the seedbed is held between the first claw part of the first holding member and the second claw part of the second holding member by rotating the first holding member and the second holding member relative to each other, unlike the conventional seedbed holding unit configured such that the seedbed is held between a pair of the holding pieces that are capable of moving closer to and away from each other, it is not necessary to secure the movement space for causing the first holding member and the second holding member to move closer to and away from each other in the lateral direction, and hence, even in the case where the holding member is caused to pass through a hole of a predetermined size, it is possible to secure the sufficient width of each holding member. With this, it is possible to secure the rigidity of each holding member, and reliably and firmly hold the seedbed without causing deformation in each holding member.

In addition, by adopting the configuration in which the seedbed is held between the first claw part and the second claw part by moving the first claw part and the second claw part in a circumferential direction, unlike the conventional seedbed holding unit, limitations, such as the impossibility to separately hold each of a plurality of portions of the seedbed that are spaced apart in a direction in which the holding pieces move closer to and away from each other, are not posed, and hence flexibility in design related to the portion of the seedbed to be held is improved, and it is possible to reliably and stably hold the seedbed in accordance with the form of the seedbed.

According to a second aspect of the present invention, by providing the first holding member with a plurality of the first claw parts in a fixed state and providing the second holding member with a plurality of the second claw parts in a fixed state, it is possible to reliably synchronize timings of holding by the plurality of the claw parts, and hence it is possible to hold a plurality of portions of the seedbed at the same time using the plurality of the claw parts and, in particular, even in the case where the outer edge of the seedbed is held instead of holding a portion near the center of the seedbed in order to avoid damage to a plant, it is possible to hold a plurality of portions in the outer edge of the seedbed so that it is possible to grasp the seedbed in a well-balanced manner.

According to a third aspect of the present invention, the first claw part and the second claw part are provided on outer edge sides of a first claw supporting part and a second claw supporting part, whereby it is possible to hold a portion near the outer edge of the seedbed using the claw parts instead of the portion near the center of the seedbed in which seeds and roots of the plant are retained, and hence it is possible to firmly hold the seedbed without damaging the plant retained in the seedbed.

According to a fourth aspect of the present invention, the second holding member has a pipe part, and the first holding member has a shaft part that extends along the rotation axis and is inserted into the pipe part, whereby it is possible to bear the shaft part of the first holding member using the pipe part of the second holding member, and hence a necessity to additionally provide a bearing member is eliminated, the occurrence of a trouble is prevented by simplifying the structure, and it is possible to achieve a reduction in the size of each of the first holding member and the second holding member. In addition, by disposing the shaft part of the first holding member inside the pipe part of the second holding member, it is possible to prevent an increase in size in the lateral direction even in the case where the rigidity of each of the pipe part and the shaft part is secured.

According to a fifth aspect of the present invention, by fixing the second holding member having the pipe part to a base part and rotationally driving the first holding member having the shaft part disposed in the pipe part, it is possible to prevent the rotationally driven shaft part from being exposed to the outside to secure the safety of a user, and the design of a peripheral environment is facilitated.

According to a sixth aspect of the present invention, by driving the base part using an advance/retreat driving part such that the base part is able to advance or retreat along the rotation axis direction, it is possible to insert or pull out the seedbed into or from a seedbed retaining part formed in a container or the like in a state in which the seedbed is held by the claw parts, and hence it is possible to stably and smoothly perform a transplantation operation of the seedbed.

REFERENCE SIGNS LIST

Figure 1:
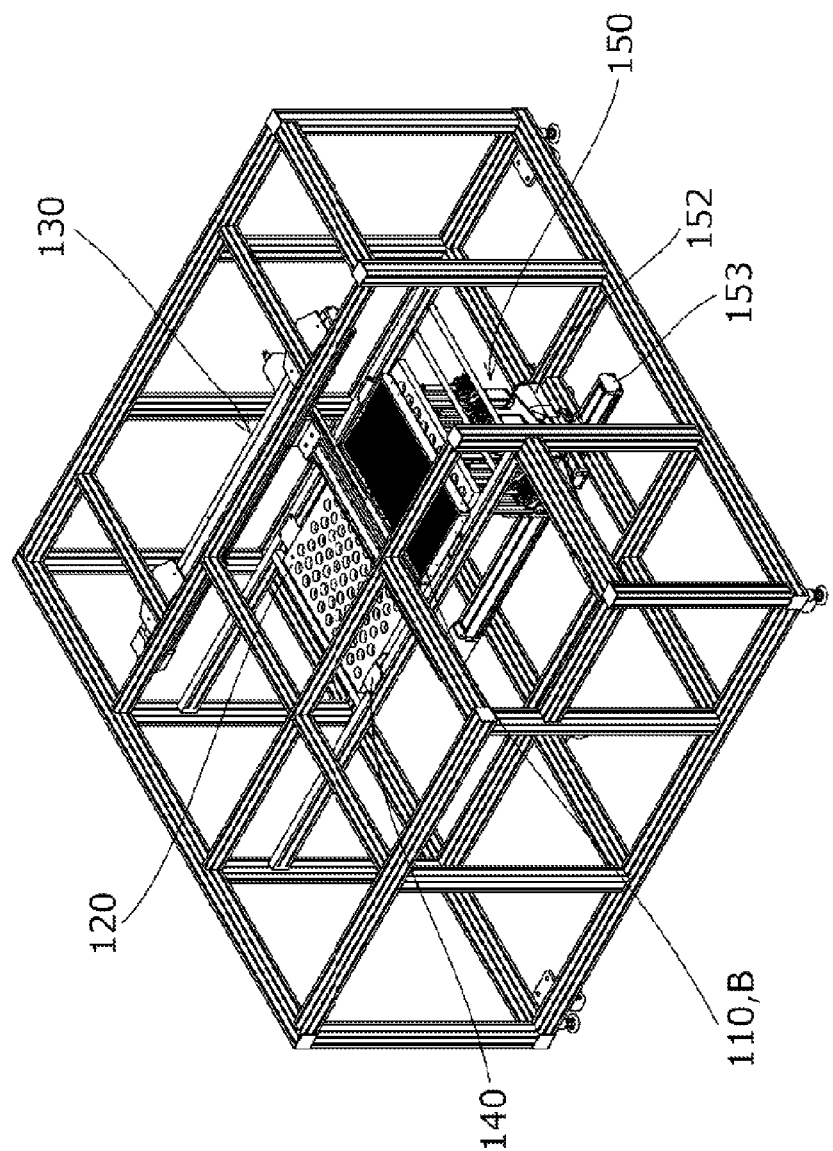
FIG. 1 is a perspective view showing a plant-transplanting device into which a seedbed holding unit as a first embodiment of the present invention is incorporated.

100 Plant-transplanting device
110 Plant holder
120 Cultivation pallet
130 Holder retaining/moving mechanism
140 Pallet retaining mechanism
150 Transferring mechanism
151 Supporting part
152 Lateral linear actuator
153 Longitudinal linear actuator
160, 260 Seedbed holding unit
170, 270 First holding member
171 Shaft part
172, 272 First claw supporting part
173, 273 First claw part
174 Driven part
180, 280 Second holding member
181, 281 Pipe part
182, 282 Second claw supporting part
183, 283 Second claw part
184, 284 Flange part
190, 290 Base part
191, 291 Support stand
192, 292 Rotational driving part
193 Advance/retreat driving part
194 Sliding bearing member
B Seedbed

DESCRIPTION OF EMBODIMENTS

Hereinbelow, a seedbed holding unit 160 as a first embodiment of the present invention will be described based on the drawings.

First, it should be noted that the seedbed holding unit 160 is used by being incorporated into a plant-transplanting device 100 that transplants a seedbed B from a plant holder 110 to a cultivation pallet 120. Specifically, the seedbed holding unit 160 is incorporated into a transferring mechanism 150 of the plant-transplanting device 100, and transfers the seedbed B in a vertical direction while holding the seedbed B during the transfer of the seedbed B in the vertical direction.

As shown in FIG. 1, the plant-transplanting device 100 includes the plant holder 110 in which a plurality of holder seedbed retaining parts 111 that pass through the plant holder 110 in the vertical direction and retain the seedbed B are disposed in a horizontal direction, the cultivation pallet 120 in which a plurality of pallet seedbed retaining parts 121 that pass through the cultivation pallet 120 in the vertical direction and retain the seedbed B are disposed in the horizontal direction, a holder retaining/moving mechanism 130 that retains the plant holder 110 and moves the plant holder 110 in the horizontal direction, a pallet retaining mechanism 140 that retains the cultivation pallet 120 in a fixed state, and a transferring mechanism 150 that transfers the seedbed B in the vertical direction.

Figure 7:
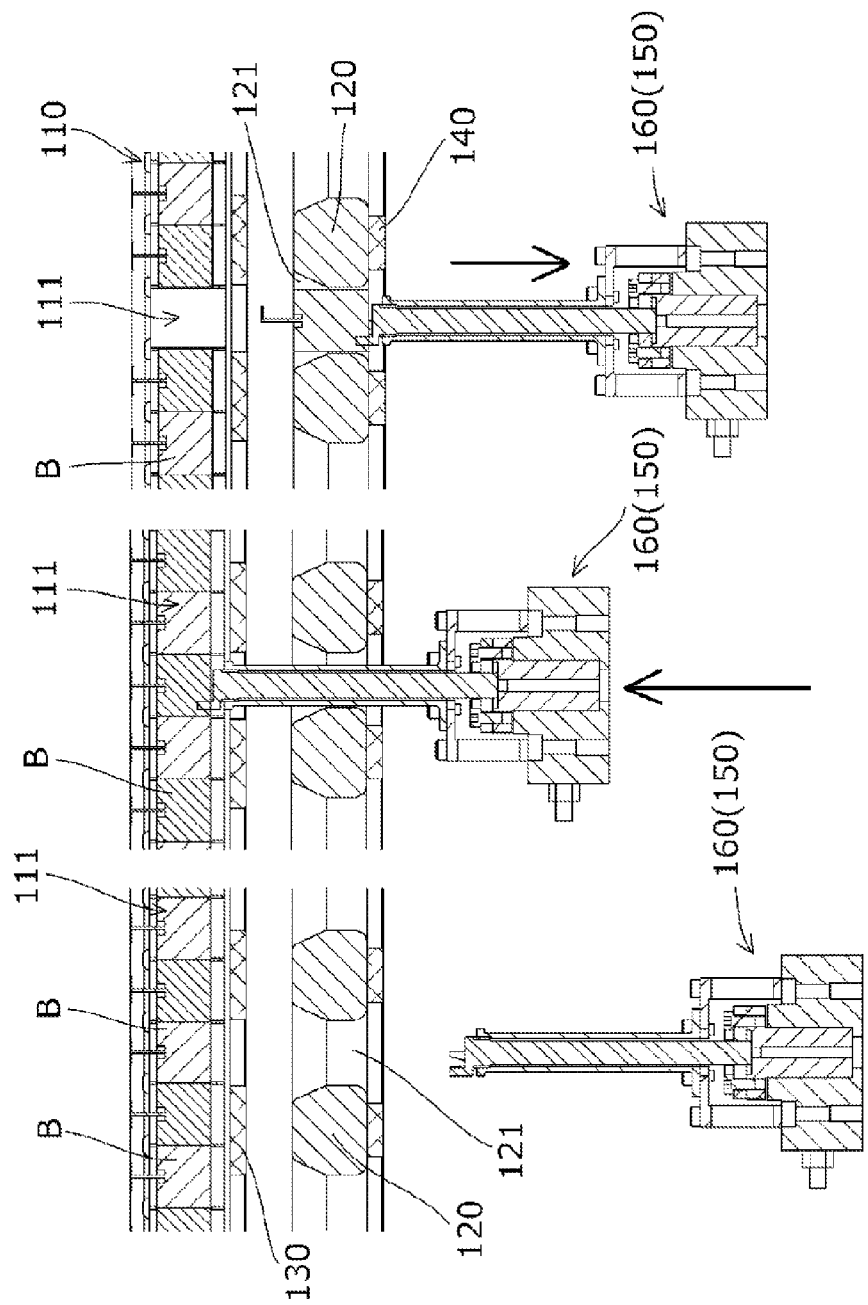
FIG. 7 is an explanatory view showing a seedbed transplanting flow.

As shown in FIG. 7, in the plant-transplanting device 100 of the present embodiment, the plant holder 110 is retained at a position above the cultivation pallet 120 by the holder retaining/moving mechanism 130 and the pallet retaining mechanism 140, the seedbed B retained by the holder seedbed retaining part 111 is lowered and inserted into the pallet seedbed retaining part 121 by the transferring mechanism 150, and the seedbed B is thereby transplanted.

Note that, conversely, the plant-transplanting device 100 may also be configured such that the plant holder 110 is retained at a position below the cultivation pallet 120, the seedbed B retained by the holder seedbed retaining part 111 is raised and inserted into the pallet seedbed retaining part 121 by the transferring mechanism 150, and the seedbed B is thereby transplanted.

Figure 3:
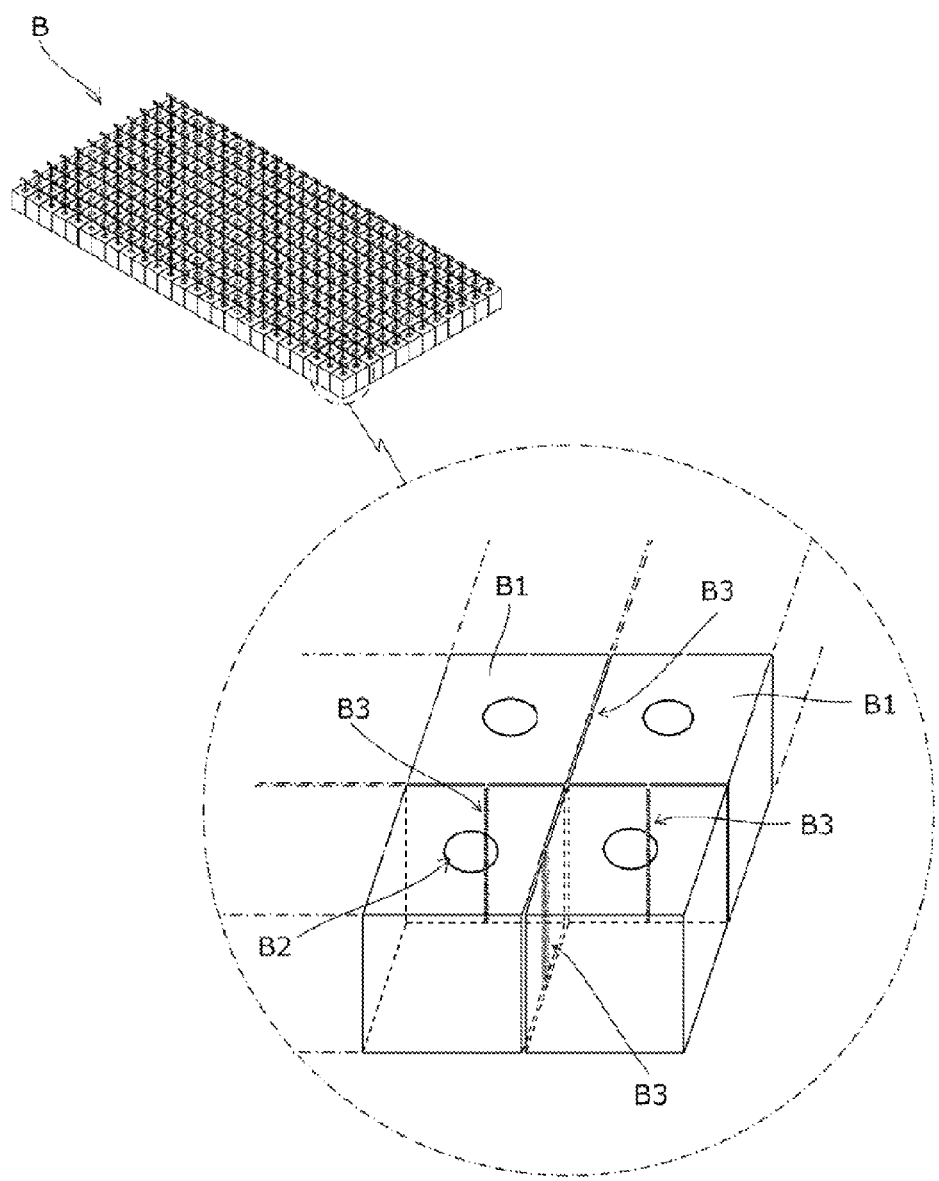
FIG. 3 is an explanatory view showing a seedbed.

The seedbed B in the present embodiment is formed of urethane or the like and is formed into a mat-like shape in which a plurality of seedbeds B1 each having a seed and seedling accommodating part B2 are coupled to each other longitudinally and laterally, as shown in FIG. 3. Each seedbed B1 is partially coupled to the adjacent seedbed B1 at the central portion of each side of the seedbed B1 with a coupling part B3 that extends along a thickness direction of the seedbed B. Note that the specific form of the seedbed B1 is not limited to the form described above, and the specific form thereof may be any form.

Next, the transferring mechanism 150 into which the seedbed holding unit 160 of the present embodiment is incorporated will be described based on the drawings.

Figure 2:
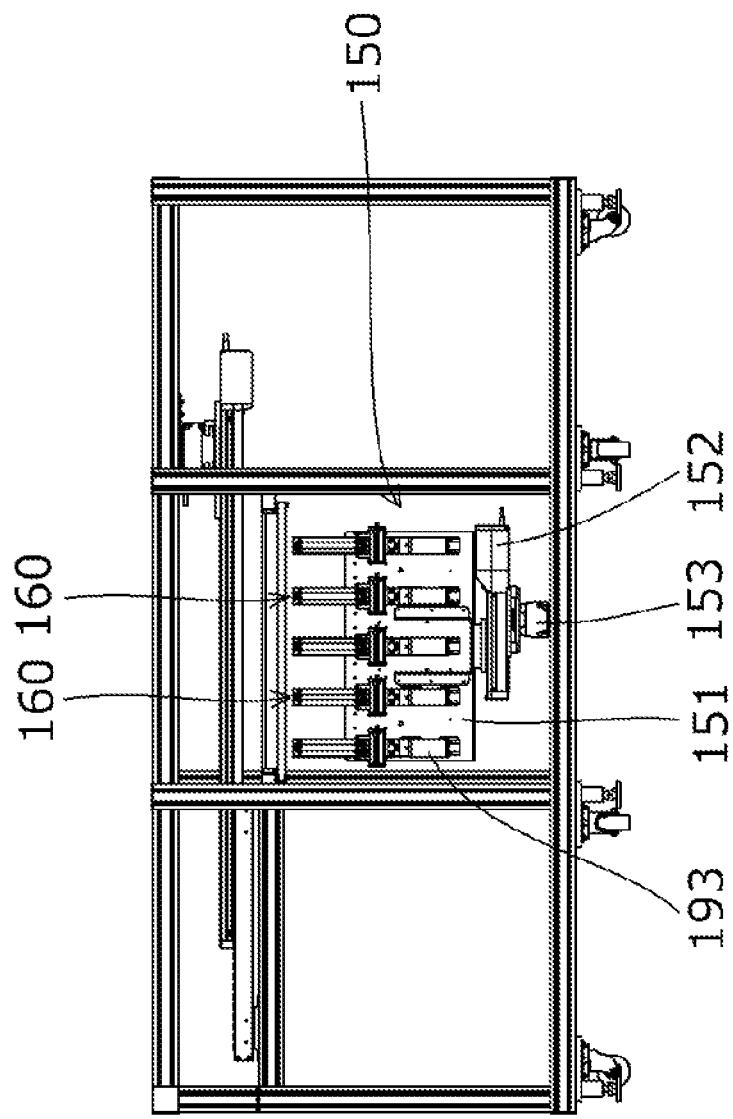
FIG. 2 is a front view showing the plant-transplanting device.

As shown in FIG. 1 and FIG. 2, the transferring mechanism 150 has a plurality of the seedbed holding units 160, a supporting part 151 that supports the plurality of the seedbed holding units 160, a lateral linear actuator 152 that moves the supporting part 151 in the lateral direction, and a longitudinal linear actuator 153 that moves the lateral linear actuator 152 in a longitudinal direction, adjusts the position of each seedbed holding unit 160 in the horizontal direction using the lateral linear actuator 152 and the longitudinal linear actuator 153, and transfers the seedbed B in the vertical direction in a state in which the seedbed B is held by the seedbed holding unit 160.

Figure 4:
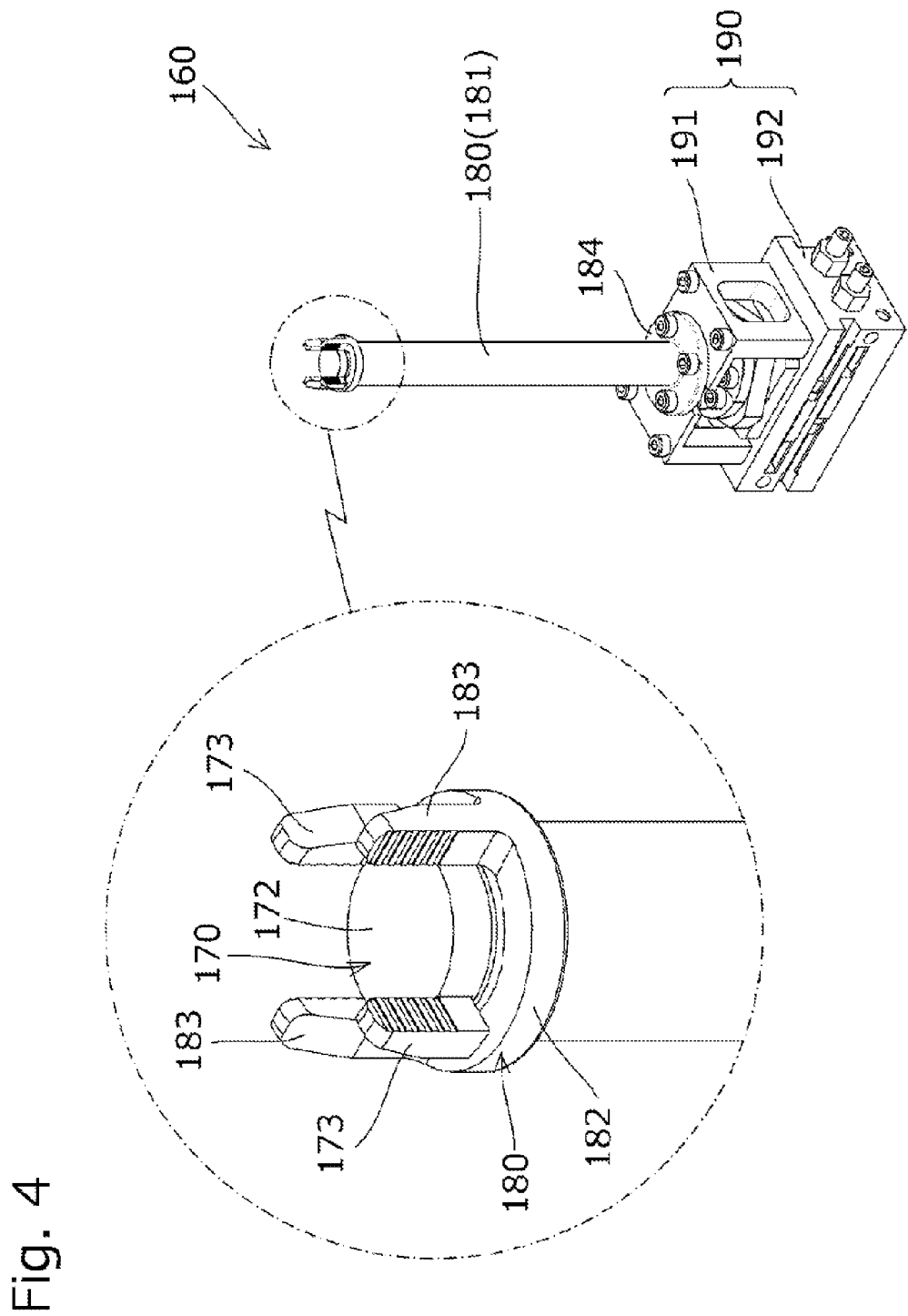
FIG. 4 is an explanatory view showing the seedbed holding unit in a state in which claw parts are spaced apart.
Figure 5:
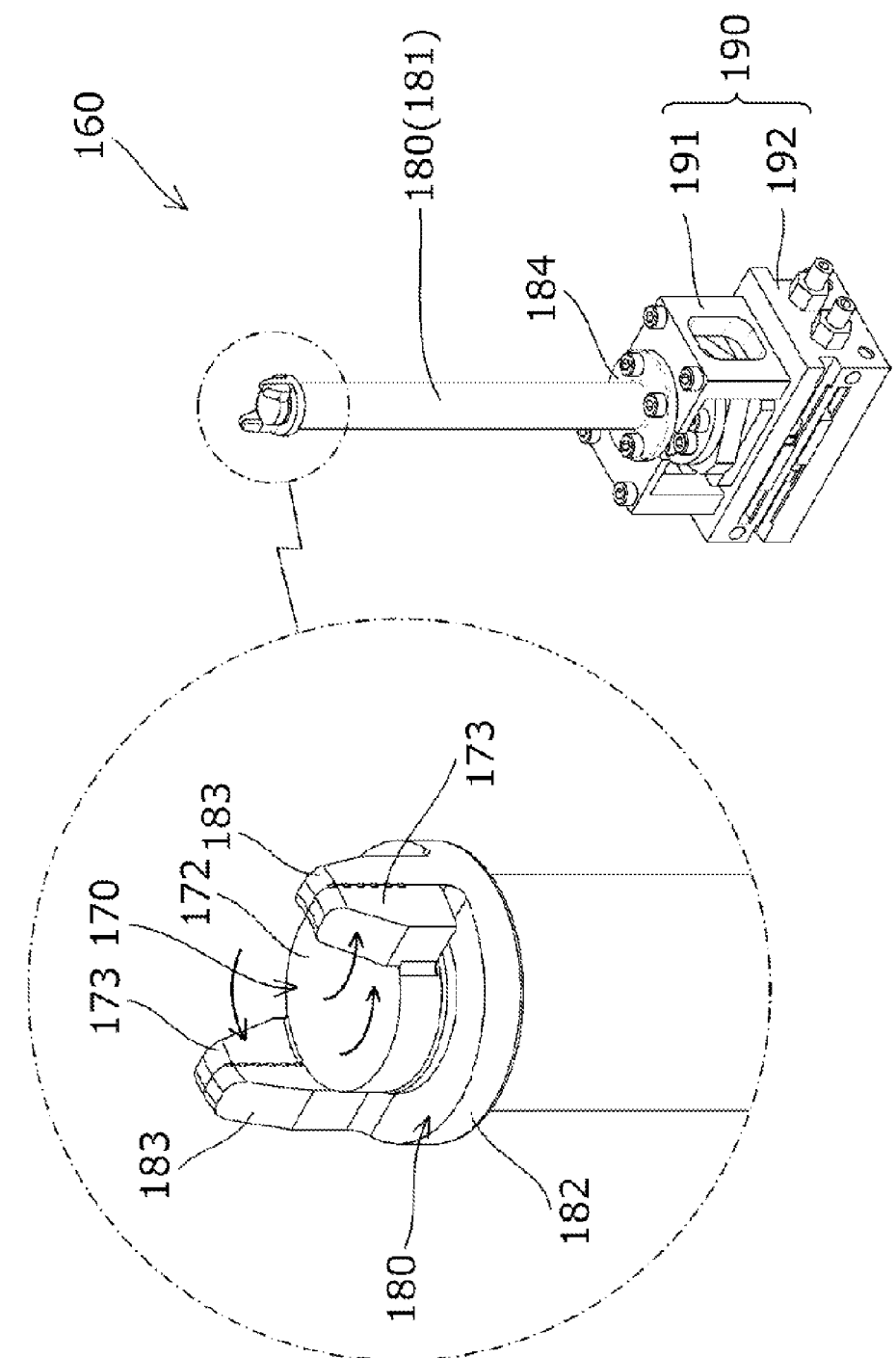
FIG. 5 is an explanatory view showing the seedbed holding unit in a state in which the claw parts are in contact with each other.
Figure 6:
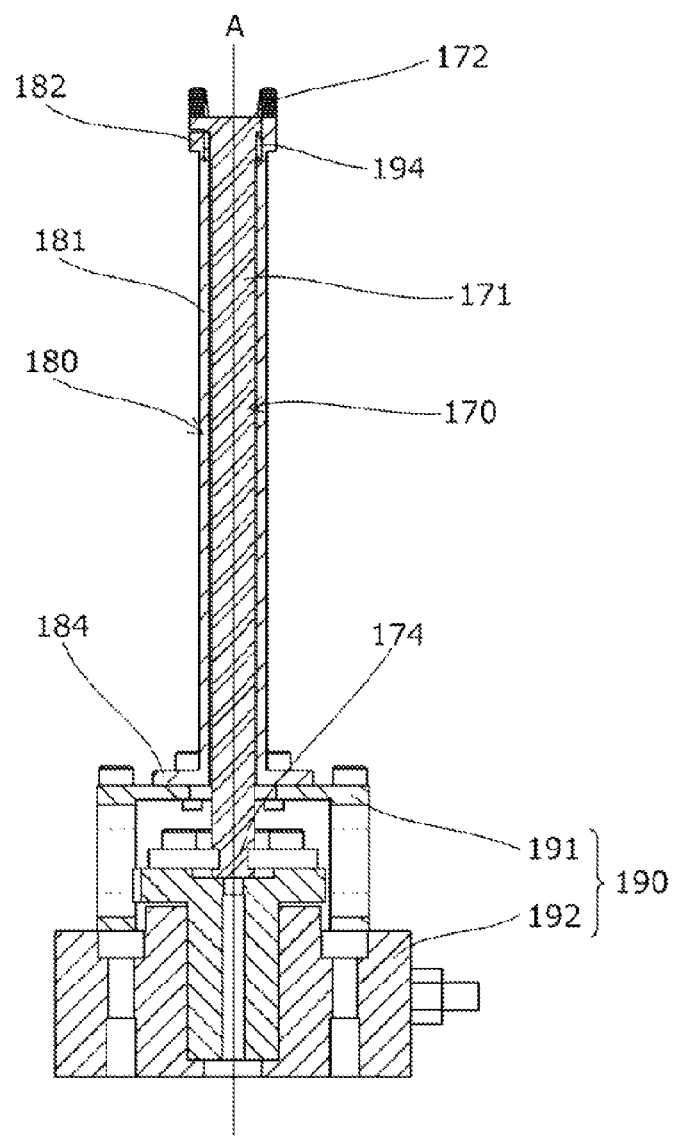
FIG. 6 is a cross-sectional view showing the seedbed holding unit.

As shown in FIG. 4 to FIG. 6, each seedbed holding unit 160 includes a first holding member 170 and a second holding member 180 that are rotatable relative to each other about a predetermined rotation axis A, a base part 190 that supports the first holding member 170 and the second holding member 180, and an advance/retreat driving part 193 (shown in FIG. 2) that drives the base part 190 such that the base part 190 is able to advance or retreat along the vertical direction (rotation axis direction).

The first holding member 170 is formed of a rigid material such as metal and, as shown in FIG. 4 to FIG. 6, integrally includes a bar-shaped shaft part 171 that extends along the predetermined rotation axis A, a first claw supporting part 172 that is formed at the tip of the shaft part 171, two first claw parts 173 that are formed on the first claw supporting part 172, and a driven part 174 that is formed at the lower end of the shaft part 171 and engages with a rotational driving part 192 of the base part 190. The first claw supporting part 172 has an outer edge that is circular when it is viewed in the rotation axis direction, and the two first claw parts 173 are formed at positions that oppose each other with an angle of 180° on the outer edge of the first claw supporting part 172.

The second holding member 180 is formed of a rigid material such as metal and, as shown in FIG. 4 to FIG. 6, integrally includes a cylindrical pipe part 181 that extends along the rotation axis direction, a second claw supporting part 182 that is formed at the tip of the pipe part 181, two second claw parts 183 that are formed on the second claw supporting part 182, and a flange part 184 that is formed at the lower end of the pipe part 181 and fixed to the base part 190. The second claw supporting part 182 has an outer edge that is circular when it is viewed in the rotation axis direction, and the two second claw parts 183 are formed at positions that oppose each other with an angle of 180° on the outer edge of the second claw supporting part 182. As shown in FIG. 6, the shaft part 171 of the first holding member 170 is inserted into the pipe part 181 of the second holding member 180. Note that, in the present embodiment, as shown in FIG. 6, a sliding bearing member 194 is disposed between the first holding member 170 and the second holding member 180 but, in the case where the shaft part 171 and the pipe part 181 are configured so as to slide relative to each other adequately, the installation of the sliding bearing member 194 is not necessary.

As shown in FIG. 4 and FIG. 5, each of the first claw part 173 and the second claw part 183 is formed such that the tip side thereof is narrower than the bottom side thereof, and an uneven nonslip part is formed on a holding surface thereof.

As shown in FIG. 4 to FIG. 6, the base part 190 has a support stand 191 to which the second holding member 180 is fixed, and the rotational driving part 192 that is disposed so as to be fixed to the support stand 191. The rotational driving part 192 engages with the shaft part 171 of the second holding member 180 and rotationally drives the second holding member 180, and is configured as an air-driven actuator in the present embodiment. Note that the specific form of the rotational driving part 192 may be any form as long as the rotational driving part causes the first holding member 170 and the second holding member 180 to rotate relative to each other, and the rotational driving part may be, e.g., an electric motor.

The advance/retreat driving part 193 is configured as the air-driven actuator, and drives the base part 190 such that the base part 190 is able to advance or retreat along the vertical direction. Note that the specific form of the advance/retreat driving part 193 may be any form as long as the advance/retreat driving part drives the base part 190 such that the base part 190 is able to advance or retreat along the rotation axis direction.

The seedbed holding unit 160 configured as described above holds the seedbed B using the first claw parts 173 formed on the first holding member 170 and the second claw parts 183 formed on the second holding member 180 by rotating the first holding member 170 and the second holding member 180 relative to each other about the predetermined rotation axis A using the rotational driving part 192, and transfers the held seedbed B in the vertical direction by driving the base part 190 such that the base part 190 advances or retreats in the vertical direction using the advance/retreat driving part 193.

Next, a seedbed holding unit 260 according to a second embodiment of the present invention will be described based on FIG. 8. Herein, in the second embodiment, the configurations other than that of the claw part formed in the holding member are the same as those in the first embodiment described above. Accordingly, the description of the configurations other than that of the claw part will be omitted by changing the leftmost digit of each reference sign shown in the description and the drawings related to the first embodiment from 1 to 2.

Figure 8:
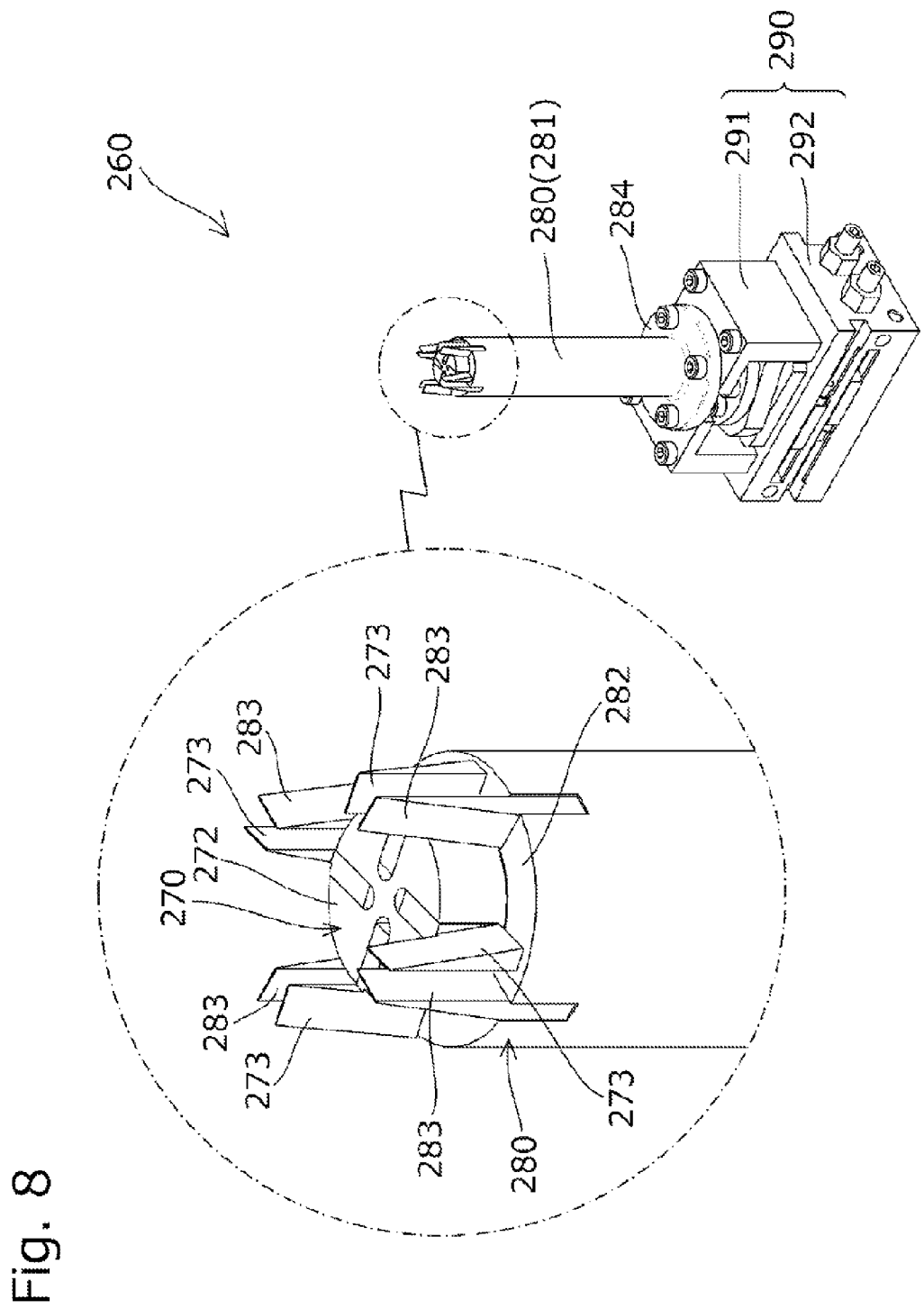
FIG. 8 is an explanatory view showing a seedbed holding unit as a second embodiment of the present invention.
Figure 9:
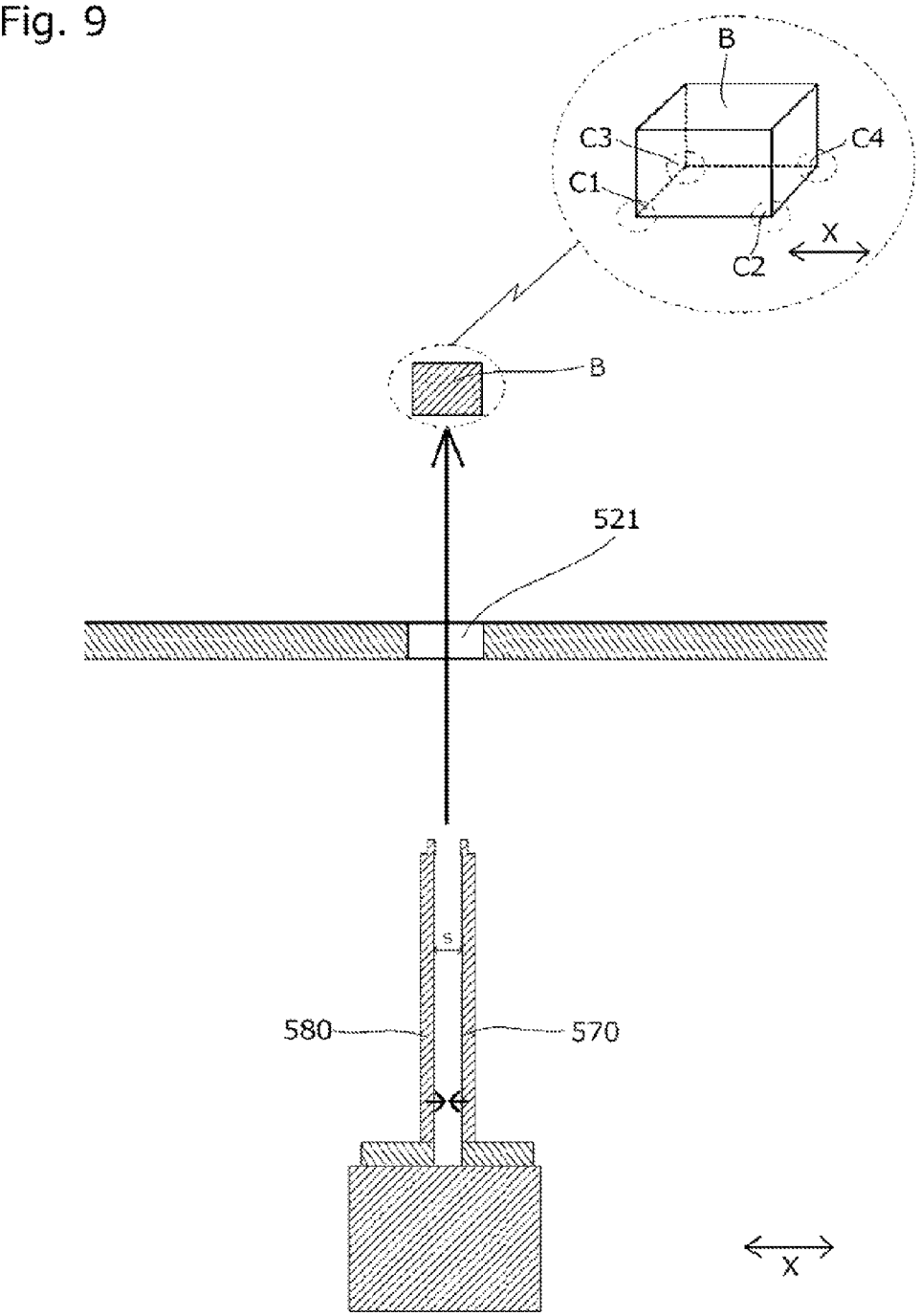
FIG. 9 is an explanatory view showing a seedbed holding unit as Reference Example.

In the second embodiment, as shown in FIG. 8, four first claw parts 273 are formed at intervals of 90° on an outer edge of a first claw supporting part 272 of a first holding member 270, and four second claw parts 283 are formed at intervals of 90° on an outer edge of a second claw supporting part 282 of a second holding member 280.

In addition, in the first embodiment, the first claw parts 173 and the second claw parts 183 are formed integrally with the first holding member 170 and the second holding member 180. On the other hand, in the second embodiment, as shown in FIG. 8, the first claw parts 273 and the second claw parts 283 are formed separately from the first holding member 270 and the second holding member 280, and are fixed to the first claw supporting part 272 and the second claw supporting part 282. Thus, in the case where the claw parts 273 and 283 are formed separately from the holding members 270 and 280, it becomes possible to perform usage such as replacing the claw parts 273 and 283 when the claw parts 273 and 283 are damaged or changing the type of each of the claw parts 273 and 283 in accordance with the size and shape of the seedbed B.

Thus, the embodiments of the present invention have been described, but the present invention is not limited to the above embodiments, and various design changes can be made without departing from the present invention described in the claims.

For example, in the embodiments described above, the description has been made on the assumption that the seedbed holding unit is used for the transplantation of the seedbed into the cultivation pallet from the plant holder, but the specific usage of the seedbed holding unit is not limited thereto, and the usage of the seedbed holding unit may be any usage as long as the usage requires holding of the seedbed.

In addition, in the embodiments described above, the description has been made on the assumption that two or four first claw parts and two or four second claw parts are provided, but the specific number of the first claw parts or the second claw parts only needs to be one or more. In the case where a plurality of the first claw parts and a plurality of the second claw parts are provided, it is preferable to dispose the claw parts at regular angle intervals on the outer edge of the claw supporting part of each holding member.

Further, in the embodiments described above, the description has been made on the assumption that the seedbed is held by the first claw part and the second claw part by fixing the second holding member and rotating the first holding member, but the seedbed holding unit may be configured such that the second holding member is also rotated when the seedbed is held.

The invention claimed is:

1. A seedbed holding unit that holds a seedbed used in plant cultivation, the seedbed holding unit comprising:
    a first holding member and a second holding member that are rotatable relative to each other about a predetermined rotation axis, wherein
    the first holding member is provided with a first claw part in a fixed state,
    the second holding member is provided with a second claw part in a fixed state, and
    the seedbed is held between the first claw part and the second claw part by rotating the first holding member and the second holding member relative to each other, wherein
    the second holding member has a pipe part, and
    the first holding member has a shaft part that extends along the rotation axis and is inserted into the pipe part.

2. The seedbed holding unit according to claim 1, wherein the first holding member is provided with a plurality of the first claw parts in a fixed state, and
    the second holding member is provided with a plurality of the second claw parts in a fixed state.

3. The seedbed holding unit according to claim 1, wherein the first holding member has a first claw supporting part that supports the first claw part on a tip side thereof,
    the second holding member has a second claw supporting part that supports the second claw part on a tip side thereof,
    the first claw supporting part and the second claw supporting part respectively have an outer edge that is circular when viewed in a rotation axis direction, and
    the first claw part and the second claw part are respectively provided on respective outer edge sides of the first claw supporting part and the second claw supporting part.

4. The seedbed holding unit according to claim 1, further comprising:
    a base part that supports the pipe part of the second holding member in a fixed state, wherein
    a rotational driving part that rotationally drives the shaft part of the first holding member is disposed in the base part.

5. The seedbed holding unit according to claim 4, further comprising:
    an advance/retreat driving part that drives the base part such that the base part is able to advance or retreat along the rotation axis direction.

* * * * *